(12) United States Patent
Oren

(10) Patent No.: US 12,447,691 B2
(45) Date of Patent: Oct. 21, 2025

(54) METHOD FOR PRODUCING A TOOL INCLUDING A SHEET

(71) Applicant: Ronen Oren, Tel Aviv-Jaffa (IL)

(72) Inventor: Ronen Oren, Tel Aviv-Jaffa (IL)

(*) Notice: Subject to any disclaimer, the term of this patent is extended or adjusted under 35 U.S.C. 154(b) by 275 days.

(21) Appl. No.: 18/132,396

(22) Filed: Apr. 9, 2023

(65) Prior Publication Data

US 2024/0042702 A1 Feb. 8, 2024

(30) Foreign Application Priority Data

Aug. 2, 2022 (IL) .......................................... 295305

(51) Int. Cl.
*B29C 65/08* (2006.01)
*B29C 65/00* (2006.01)

(52) U.S. Cl.
CPC .......... *B29C 65/08* (2013.01); *B29C 66/7486* (2013.01)

(58) Field of Classification Search
CPC .... B29C 65/08; B29C 65/081; B29C 66/7486
See application file for complete search history.

(56) References Cited

U.S. PATENT DOCUMENTS 3,254,402 A * 6/1966 Balamuth ............... B29C 65/08
228/171
3,924,013 A * 12/1975 Kane ....................... B32B 27/10
426/127

* cited by examiner

*Primary Examiner* — Daniel McNally
(74) *Attorney, Agent, or Firm* — AlphaPatent Associates Ltd.; Daniel J. Swirsky

(57) ABSTRACT

A method for producing a tool including a sheet, the method including the steps of: providing a first cellulose sheet; attaching first and second plastic layers each to one side of the first cellulose sheet; upon the attaching, placing a first side of a plastic object on the first plastic layer; pressing a metal object on a portion of a second side of the plastic object; vibrating the metal object parallel to the first plastic layer together with the pressing thereon; and ceasing the vibrating, thereby ceasing the heating.

4 Claims, 9 Drawing Sheets

FIG 1 - PRIOR ART

METHOD FOR PRODUCING A TOOL INCLUDING A SHEET

CROSS-REFERENCE TO RELATED APPLICATIONS

This application claims the benefit of priority from Israel Patent Application No. 295305, filed Aug. 2, 2022, the disclosure of which is incorporated herein by reference.

TECHNICAL FIELD

The invention relates to the field of plastic bags and the production thereof. More particularly, the invention relates to a method and apparatus for producing sheets and bags.

BACKGROUND

FIG. 1 depicts conventional methods for connecting two sheets.

The following method is suitable for connecting sheets 26A and 26B being of plastic.

A heated body 24A heats a portion of a plastic sheet 26A, for partially melting it; and a heated body 24B heats a portion of sheet 26B for partially melting it. The two melted portions mix with one other and connect upon cooling.

An additional approach, named "ultra-sonic welding", is to vibrate a body 24C along the portion of sheet 26A, for rubbing the portion of sheet 26A in relation to a portion of sheet 26B. The rubbing heats the portions and partially melts them. The two melted portions mix with one other and connect upon cooling.

However, heated bodies 24A and 24B and vibrating body 24C are not suitable for connecting sheets 26A and 26B if being of paper, since paper does not melt.

The following method is suitable for connecting sheets 26A and 26B being of paper.

Liquid glue 50 is disposed between a portion of sheet 26A and a portion of sheet 26B. Glue 50 connects the portions.

However, glue 50 is toxic. Further, glue 50 is not suitable for connecting sheets 26A and 26B if being of plastic.

There is a long felt need to provide a solution to the above-mentioned and other problems of the prior art for connecting sheets including plastic and cellulose.

SUMMARY

In one embodiment of the invention a method is provided for producing a bag, including the steps of:
- attaching plastic layers to a cellulose sheet;
- placing a plastic object on the plastic layer;
- pressing a metal object on the plastic object;
- vibrating the metal object; and—
- ceasing the vibrating.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
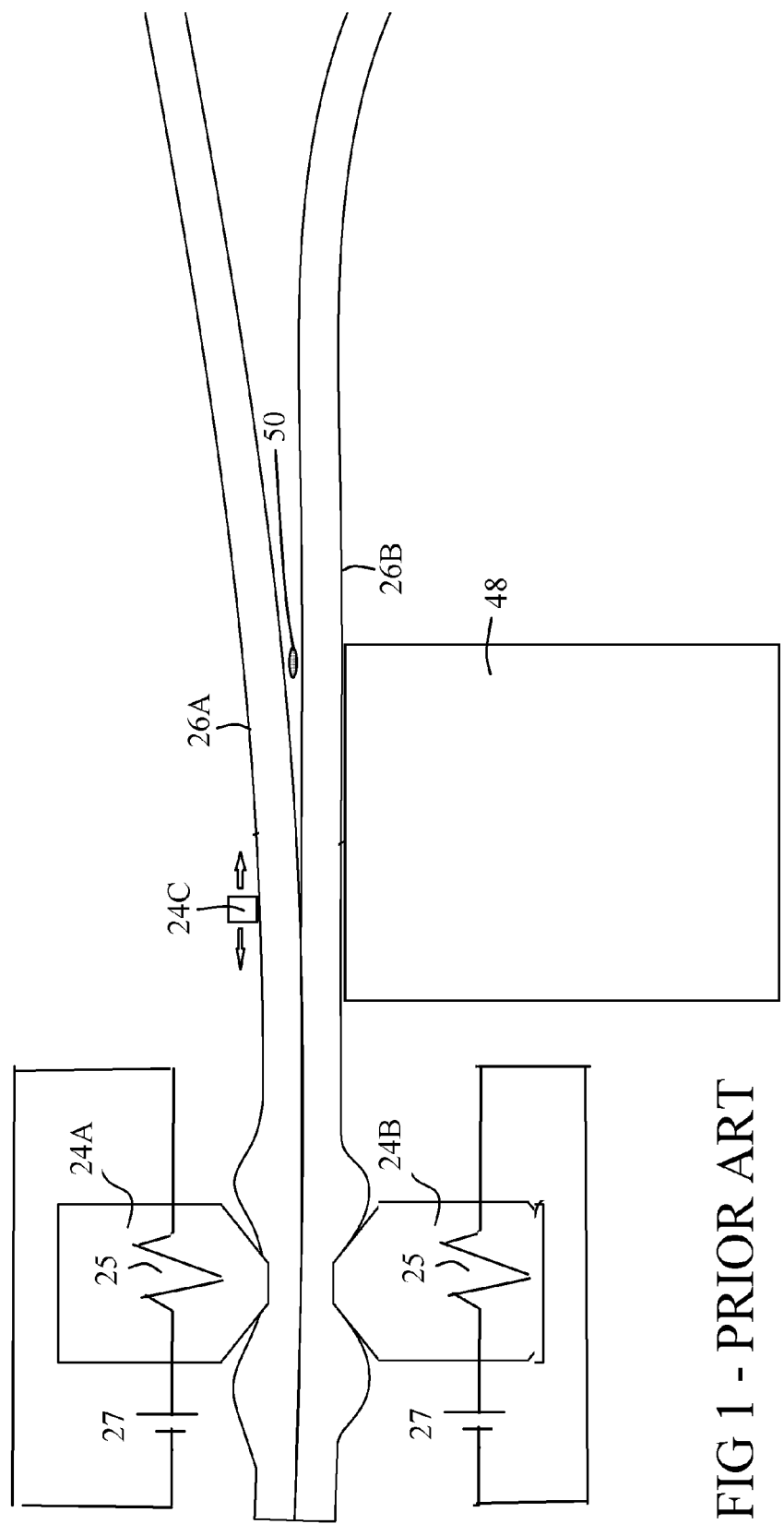
FIG. 1 depicts conventional methods for connecting two sheets.
Figure 2:
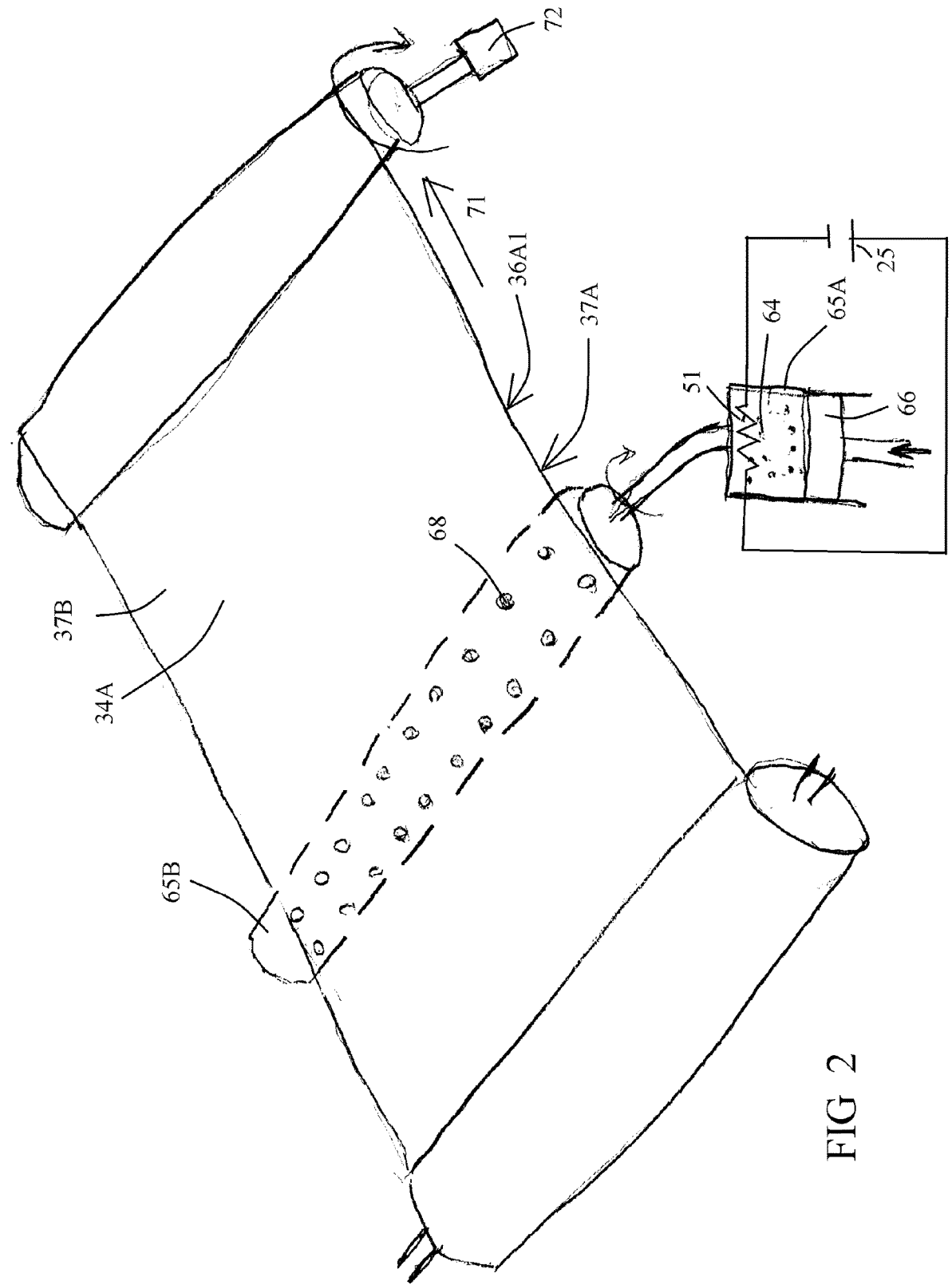
FIG. 2 depicts the steps for producing a sheet according to one embodiment of the invention.

FIG. 2 depicts the steps for producing a sheet according to one embodiment of the invention.

The term "plastic" herein includes polyethylene and other similar substances.

A cellulose or paper sheet 34A is slid 71 by a motor 72. Heated melted plastic 64 contained in a tank 65A, is pressed out of tank 65A by a piston 66 towards a dispensing tank 65B (disposed beneath cellulose sheet 36A). Melted plastic 64 is dispensed out of nozzles 68 of dispensing tank 65B out of tank dispensing tank 65B onto cellulose sheet 34A or spread in another technique, thus forming upon cooling, a plastic layer 36A1 attached to cellulose sheet 34A below the sheet.

Figure 3:
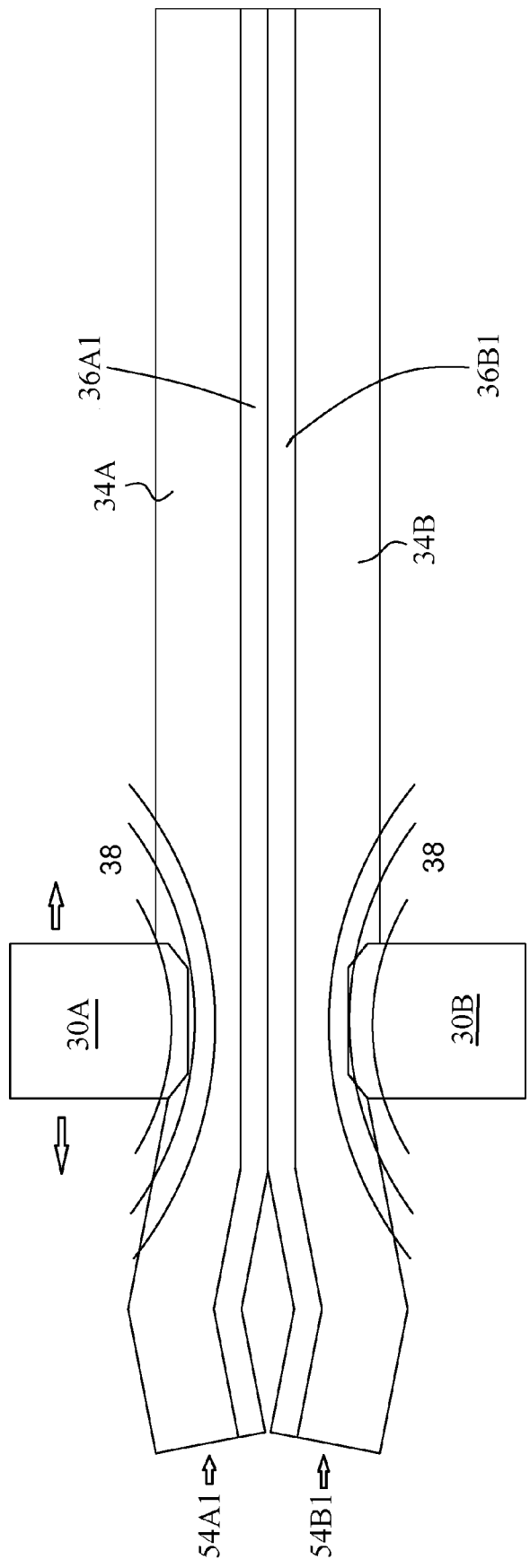
FIG. 3 depicts the steps for connecting two sheets each including cellulose and plastic.

FIG. 3 depicts the steps for connecting two sheets each including cellulose and plastic.

A sheet 54A1 includes cellulose or paper layer 34A and plastic layer 36A1 or other polymer of FIG. 2; and a sheet 54B1 includes a cellulose layer 34B and a plastic layer 36B1 or other polymer.

Sheets 54A1 and 54B1 are laid such that plastic layer 36A1 faces layer 36B1.

Then, a body 30A is placed on sheet 54A1 for pressing a portion of cellulose layer 34A, and a body 30B is placed on sheet 54B1 for pressing a portion of cellulose layer 34B.

Then body 30A vibrates along the portion of cellulose layer 34A for moving sheet 54A1 back and forth; and body 30B vibrates along the portion of cellulose layer 34B for moving sheet 54B1 back and forth; both for rubbing a portion of plastic layer 36A1 in relation to a portion of plastic layer 36B1.

However, body 30A does not sufficiently move cellulose layer 34A, and body 30B does not sufficiently move cellulose layer 34B, since cellulose layers 30A and 30B are smooth and slippery.

Further, heating of any of bodies 30A and 30B is not sufficient, since cellulose layers 34A and 34B are bad heat conductors as shown by heat conductance 38 not reaching the meeting point needed to be heated.

Figure 4:
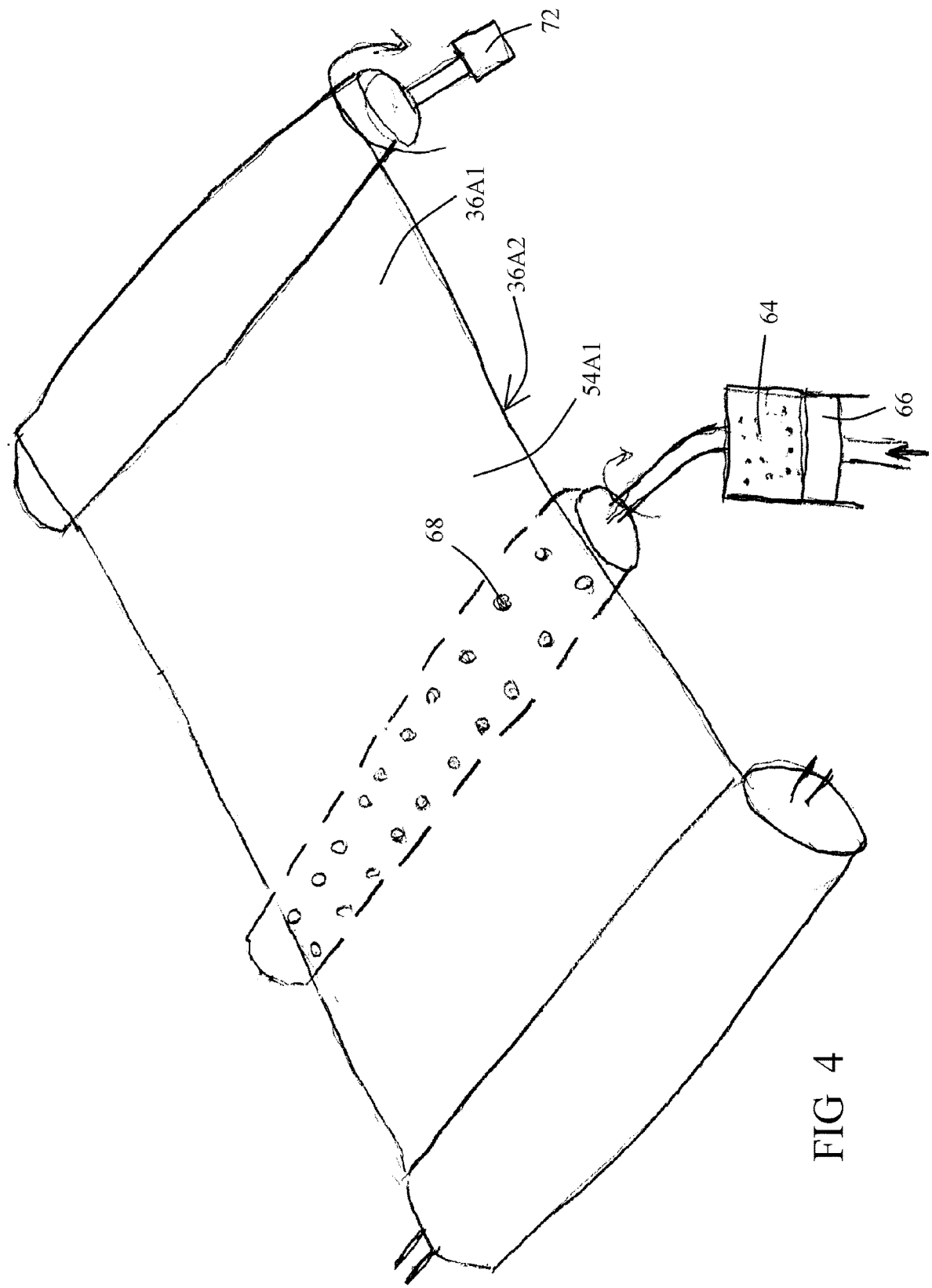
FIG. 4 depicts the steps for producing a sheet according to another embodiment of the invention.

FIG. 4 depicts the steps for producing a sheet according to another embodiment of the invention.

Sheet 54A1 is placed upside-down to the position of FIG. 2, such that plastic layer 36A1 is disposed upwards. Sheet 54A1 is slid again, and melted plastic 64 is dispensed out of nozzles 68 (disposed beneath cellulose sheet 36A) on cellulose sheet 34A, thus forming a plastic layer 36A2 attached to cellulose sheet 34A below the sheet.

Figure 5:
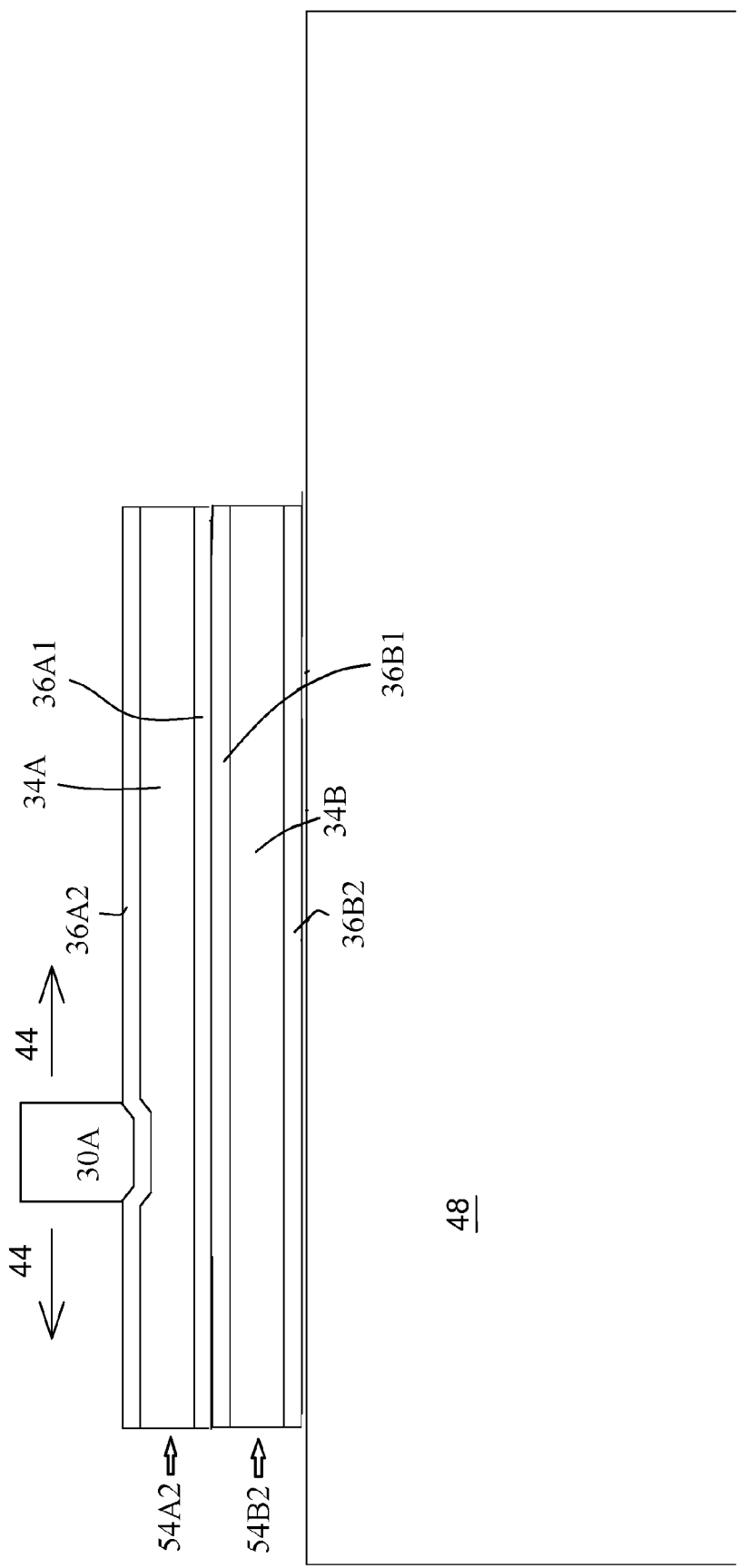
FIG. 5 depicts laying of sheets for connecting them.

FIG. 5 depicts laying of sheets for connecting them.

A sheet 54A2 includes the layers described in FIG. 4, namely cellulose layer 34A, plastic layer 36A1 or other polymer at one side of cellulose layer 34A, and plastic layer 36A2 or other polymer the other side of cellulose layer 34A. A sheet 54B2 as well includes a cellulose layer 34B, a plastic layer 36B1 or other polymer at one side of cellulose layer 34B, and a plastic layer 36B2 or other polymer the other side of cellulose layer 34B.

Sheet 54B2 is laid on a bench 48, thus plastic layer 36B2 faces bench 48; sheet 54A2 is laid on sheet 54B2, thus plastic layer 36A1 faces plastic layer 36B1.

Figure 6:
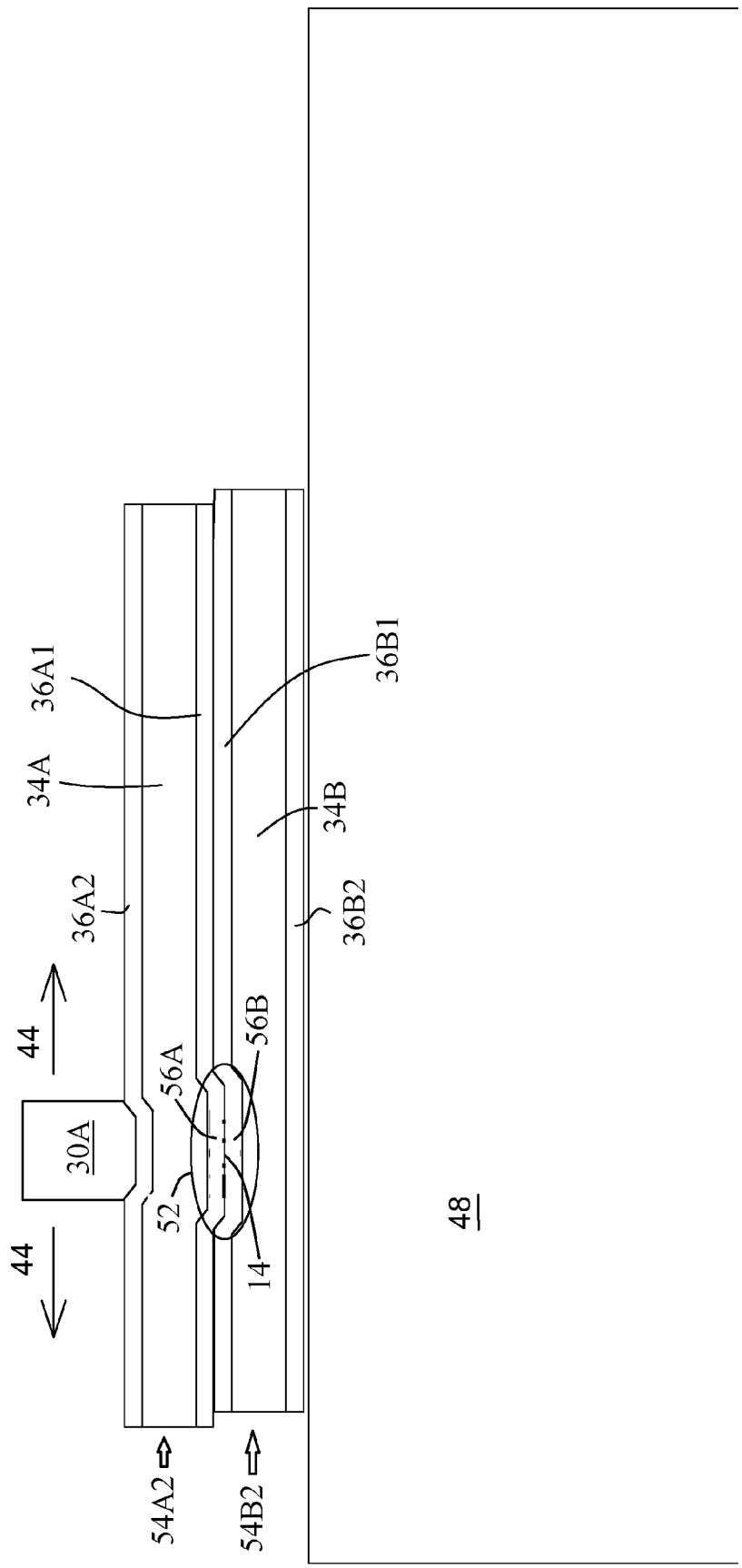
FIG. 6 depicts the step after FIG. 5.

FIG. 6 depicts the step after FIG. 5.

Then, body 30A is placed on sheet 54A1 for pressing plastic layer 36A2.

Then body 30A vibrates along the portion of plastic layer 36A2 for moving sheet 54A2 back and forth.

Plastic layer 36A2 is not slippery, thus the vibration of body 30A1 indeed moves sheet 54A2. Plastic layer 36B2 is not slippery, thus the vibration of body 30A1 does not move sheet 54B2.

Thus, the vibration of body 30A moves sheet 54A2 back and forth in relation to sheet 54B2, thus, portion 56A of plastic layer 36A1 of sheet 54A2 sufficiently rubs portion 56B plastic layer 36B2 of sheet 54B2.

The rubbing heats (52) plastic portions 56A and 56B and partially melts them. Melted portions 56A and 56B mix with one another and make a connection 14 therebetween upon cooling by ceasing the rubbing.

Thus, plastic layers 36A1 and 36B1 are produced (in FIG. 2 and FIG. 4) to be sufficiently thick for providing connection 14 to be sufficiently strong.

Figure 7:
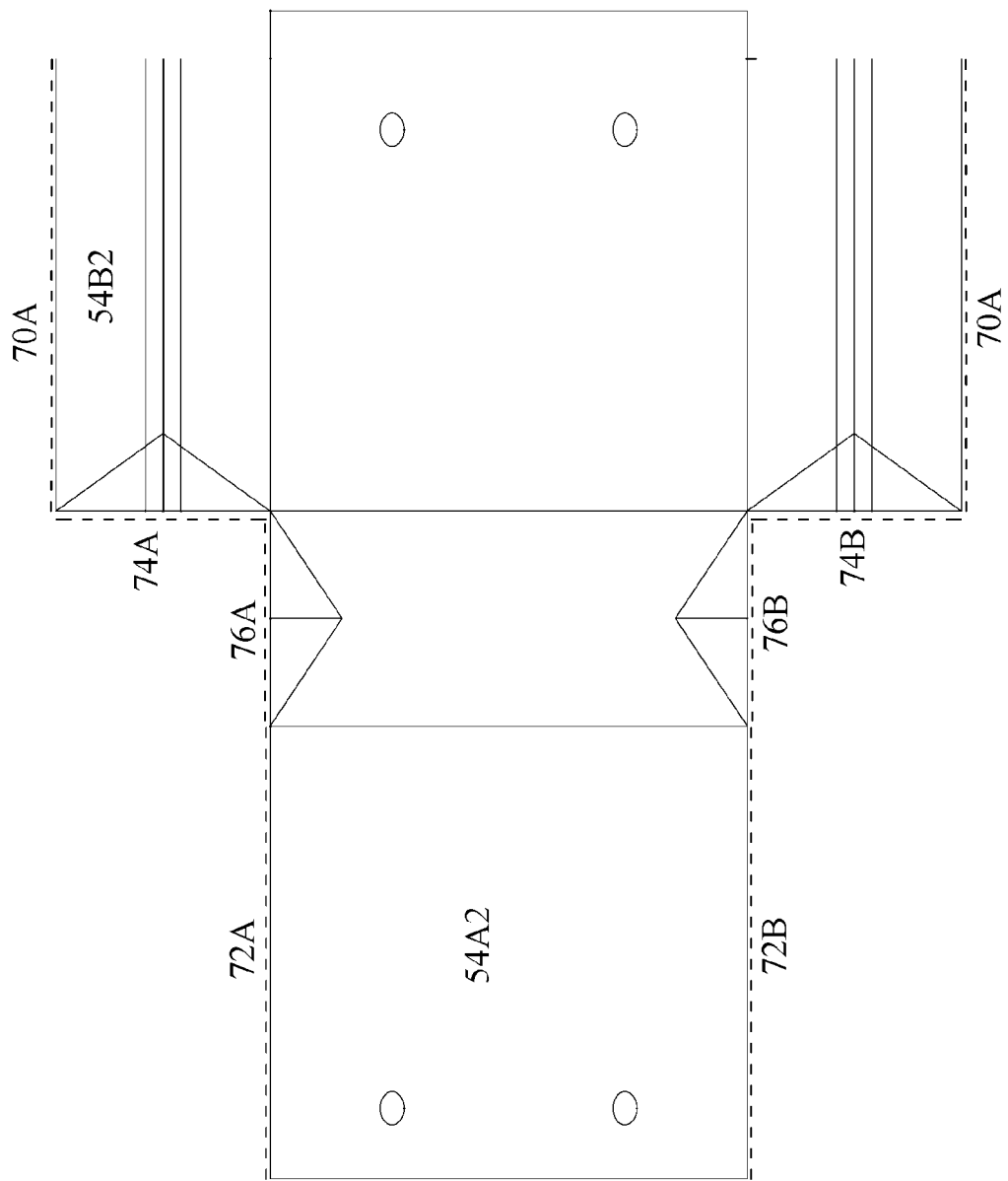
FIG. 7 depicts the sheets of FIG. 6 for another deployment, prior to connection.

FIG. 7 depicts the sheets of FIG. 6 for another deployment, prior to connection.

Sheets 54A2 and 54B2 may be included in a single sheet 86, for being connected to itself by the steps of FIG. 5 and FIG. 6.

Figure 9:
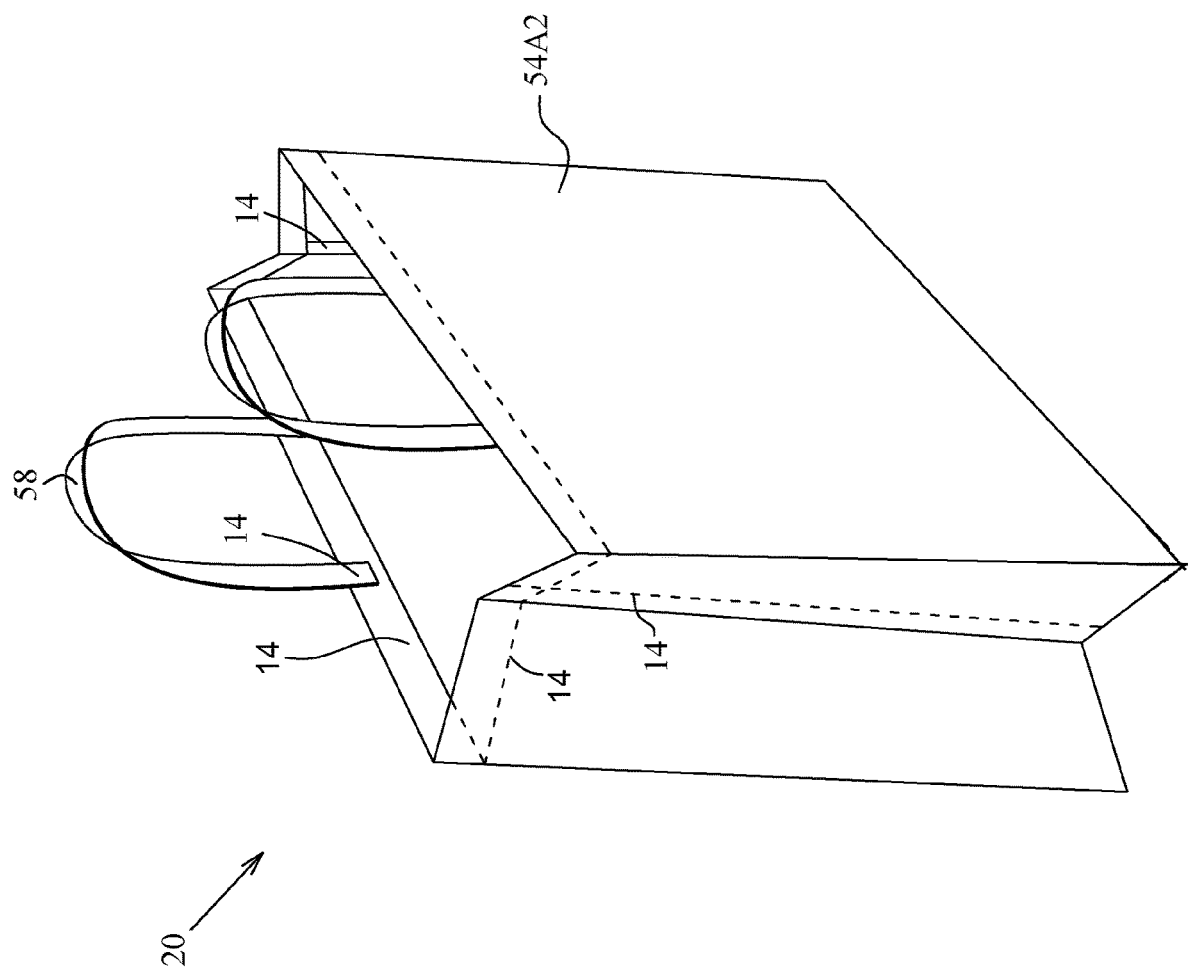
FIG. 9 depicts the sheet of FIG. 7 and the strap of FIG. 9 upon being connected.

For producing a bag of FIG. 9, connection line 70A is for being connected by connection 14 of FIG. 6, to connection line 72A, thus connecting sheet 54A2 to sheet 54B2; connection line 74A is for being connected by connection 14 of FIG. 6, to connection line 76A; connection line 70B is for being connected by connection 14 of FIG. 6 to connection line 72B; and connection line 74B is for being connected by connection 14 of FIG. 6 to connection line 76B.

Figure 8:
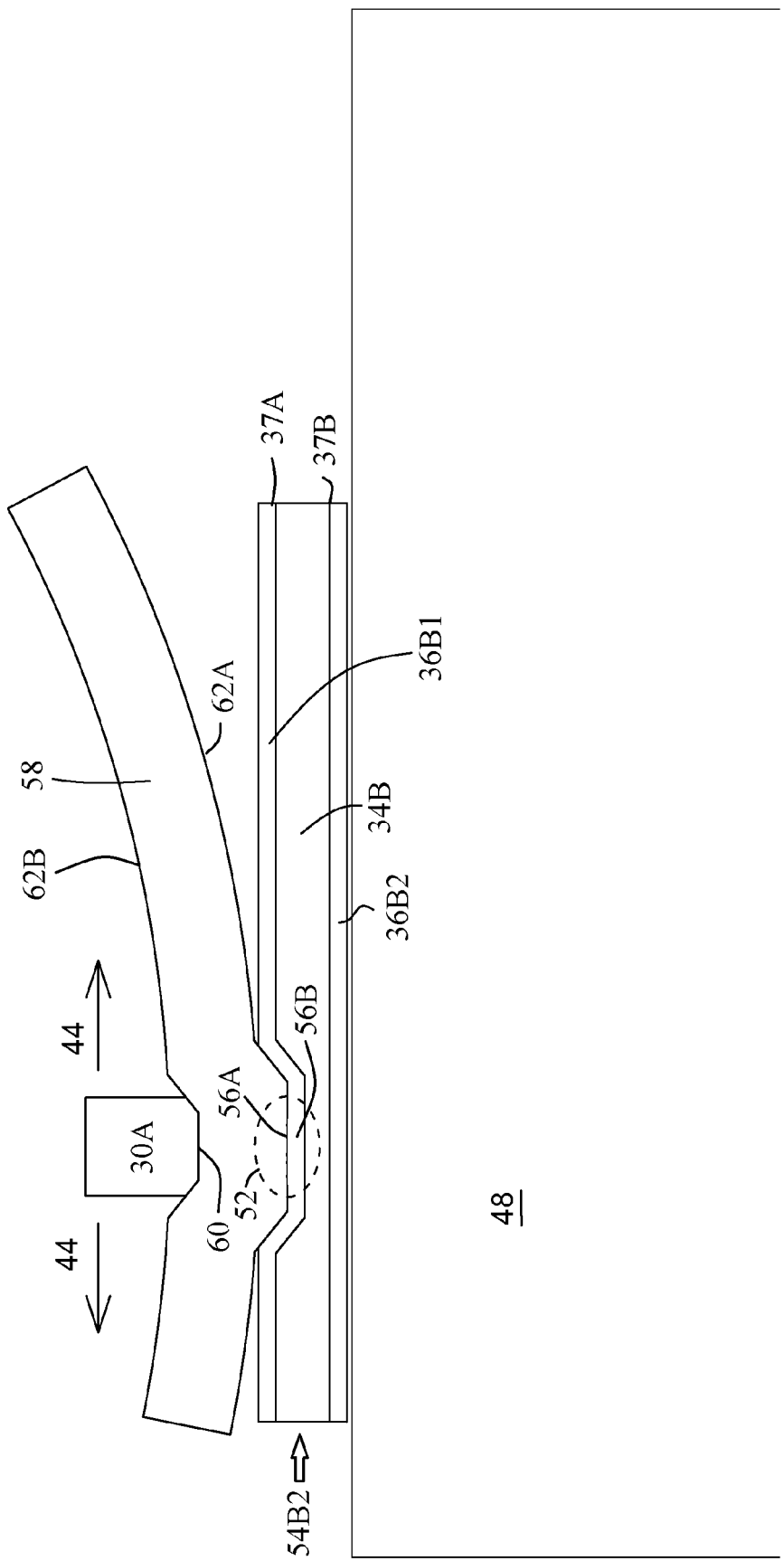
FIG. 8 depicts laying a strap on a sheet for connecting them.

FIG. 8 depicts laying a strap on a sheet for connecting them.

Sheet 54B2 is laid on bench 48, thus plastic layer 36B2 faces bench 48; and a plastic strap 58 is laid on sheet 54B2, thus faces plastic layer 36B1 of sheet 54B2.

Then, body 30A is placed on plastic strap 58 for pressing plastic layer 36A2.

Then body 30A vibrates along the portion of plastic layer 36A2 for moving plastic strap 58 back and forth.

Plastic strap 58 is not slippery, thus the vibration of body 30A1 sufficiently moves sheet 54A2. Plastic layer 36B2 is not slippery, thus the vibration of body 30A1 does not move sheet 54B2.

Thus, the vibration of body 30A moves plastic strap 58 back and forth in relation to sheet 54B2, thus, a portion of plastic strap 58 sufficiently rubs a portion of plastic layer 36B2 of sheet 54B2, for heating (52) and connecting them.

FIG. 9 depicts the sheet of FIG. 7 and the strap of FIG. 9 upon being connected.

Connections 14 may form a bag 20 including strap 58 being a handle.

Thus, in one aspect, the invention is directed to a method for producing a tool (20A) including a sheet, the method including the steps of:

providing a first paper sheet (34B);

spreading heated (51) melted plastic (64) on at least a first side (37A) of the first paper sheet (34B), thereby upon cooling of the heated melted plastic (64), at least a first (36B1) plastic layer attaches onto the at least the first side (37A) of the first paper sheet (34B).

The method may further include the steps of:

upon the attaching, placing a second side (37B) of the first paper sheet (34B) on a bench (48), and placing a first side (62A) of a plastic object (58) on the first plastic layer (36B1);

pressing (32) a metal object (30A) on a portion (60) of a second side (62B) of the plastic object (58);

vibrating (44) the metal object (30A) parallel to the first plastic layer (36B1) together with the pressing (32) thereon, thereby the second side (62B) of the plastic object (58) produces friction with the metal object (30A), being sufficient for avoiding motion in relation thereto, thereby the vibration (44) of the metal object (30A) rubs a portion (56A) of the first side (62A) of the plastic object (58) on a portion (56B) of the first plastic layer (36B1) and in relation thereto to heat (52) the rubbed portions (56A, 56B) for melting thereof; and— ceasing the vibrating, thereby ceasing the heating, wherein the first plastic layer (36B1) is sufficiently thick for connecting (14) the rubbed portions (56A, 56B) upon the melting and upon the ceasing the heating.

In another aspect, the invention is directed to a method for producing a tool (20A) including a sheet, the method including the steps of:

providing a first paper sheet (34B);

attaching first (36B1) and second (36B2) plastic layers each to one side of the first paper sheet (34B);

upon the attaching, placing the second plastic layer (36B2) on a bench (48), and placing a first side (62A) of a plastic object (58) on the first plastic layer (36B1);

pressing a metal object (30A) on a portion (60) of a second side (62B) of the plastic object (58);

vibrating (44) the metal object (30A) parallel to the first plastic layer (36B1) together with the pressing thereon, thereby the second side (62B) of the plastic object (58) produces friction with the metal object (30A), being sufficient for avoiding motion in relation thereto, and the second plastic layer (36B2) is sufficiently thick to produce friction with the bench (48) for sufficiently avoiding motion in relation thereto, thereby the vibration (44) of the metal object (30A) rubs a portion (56A) of the first side (62A) of the plastic object (58) on a portion (56B) of the first plastic layer (36B1) and in relation thereto to heat (52) the rubbed portions (56A, 56B) for melting thereof; and— ceasing the vibrating, thereby ceasing the heating, wherein the first plastic layer (36B1) is sufficiently thick for connecting (14) the rubbed portions (56A, 56B) upon the melting and upon the ceasing the heating.

The method may further include the steps of:

providing a second paper sheet (34A);

attaching first (36A1) and second (36A2) plastic layers each to one side of the second paper sheet (34A),
wherein the first plastic layer (36A1) attached to the second paper sheet (34A) consists of the first side (62A) of the plastic object (58) and is sufficiently thick for connecting (14) the rubbed portions (56A, 56B) upon the melting and the ceasing thereof, and wherein the second plastic layer (36A2) attached to the second paper sheet (34A) consists of the second side (62B) of the plastic object (58) and is sufficiently thick for producing friction with the metal object (30A), for avoiding motion in relation thereto.

The method may be applied for producing a bag (20).

The first paper sheet (34B) attached to the first (36B1) and second (36B2) plastic layers thereof, and the second paper sheet (34A) attached to the first (36A1) and second (36A2) plastic layers thereof, may be included in a single sheet (86) including the rubbed portions (56A, 56B) being connected (14) thereto.

The step of attaching the first (36B1) and second (36B2) plastic layers each to the one side of the first paper sheet (34B), may include the step of spreading heated melted plastic (64) on both of the sides of the first paper sheet (34B).

In the figures and description herein, the following reference numerals (Reference Signs List) have been mentioned:

24A, 24B: heated bodies;
24C: vibrated body;
25: heating element;
26A, 26B: plastic sheets;
27, 29: battery for powering heating;
30A, 30B: vibrating bit or other vibrating body;
32: pressing;
34A, 34B: cellulose or paper sheets;
36A1, 36A2, 36B1, 36B2: attached plastic layers;
37A, 37B: sides of cellulose or paper sheets 34A, 34B;
44: vibration being horizontal for a horizontal sheet, or parallel to the sheet;
48: bench;
50: glue;
51: heating element;
52: area heated by rubbing and friction;
54A1, 54B1, 54A2, 54B2: sheets including cellulose and plastic layers;
56A, 56B: rubbed portions;
58: strap or other plastic object;
62A, 62B: sides of plastic object 58;
65A, 65B: tanks;
71: sliding;
72: motor;
64: melted plastic;
66: piston;
68: nozzle;
70, 72, 74, 76: connection lines.

The foregoing description and illustrations of the embodiments of the invention have been presented for the purpose of illustration and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A method for producing a tool comprising a sheet, the method comprising the steps of:
   providing a first paper sheet;
   attaching first and second plastic layers each to one side of said first paper sheet;
   upon said attaching, placing said second plastic layer on a bench, and placing a first side of a plastic object on said first plastic layer;
   pressing a metal object on a portion of a second side of said plastic object;
   vibrating said metal object parallel to said first plastic layer together with said pressing thereon,
   thereby said second side of said plastic object produces friction with said metal object, being sufficient for avoiding motion in relation thereto, and said second plastic layer is sufficiently thick to produce friction with said bench for sufficiently avoiding motion in relation thereto,
   thereby said second plastic layer provided for said avoidance of the motion between said second plastic layer and said bench, provides that said vibration of said metal object rubs a rubbed portion of said first side of said plastic object on a rubbed portion of said first plastic layer and in relation thereto to heat said rubbed portions for melting thereof; and
   ceasing said vibrating, thereby ceasing heating said rubbed portions, wherein said first plastic layer is sufficiently thick for connecting said rubbed portions upon said melting and upon said heating said rubbed portions.

2. The method according to claim 1, further comprising the steps of:
   providing a second paper sheet;
   attaching first and second plastic layers each to one side of said second paper sheet,
   wherein said first plastic layer attached to said second paper sheet consists of said first side of said plastic object and is sufficiently thick for connecting said rubbed portions upon said melting and said ceasing thereof, and
   wherein said second plastic layer attached to said second paper sheet consists of said second side of said plastic object and is sufficiently thick for producing friction with said metal object, for avoiding motion in relation thereto.

3. The method according to claim 2, wherein said first paper sheet attached to said first and second plastic layers thereof, and said second paper sheet attached to said first and second plastic layers thereof, are included in a single sheet comprising said rubbed portions being connected thereto.

4. The method according to claim 1, wherein said step of attaching said first and second plastic layers each to said one side of said first paper sheet, comprises the step of spreading heated melted plastic on both of said sides of said first paper sheet.

* * * * *